United States Patent [19]

Karidis

[11] Patent Number: 4,712,027
[45] Date of Patent: Dec. 8, 1987

[54] RADIAL POLE LINEAR RELUCTANCE MOTOR

[75] Inventor: John P. Karidis, Ossining, N.Y.

[73] Assignee: International Business Machines Corporation, Armonk, N.Y.

[21] Appl. No.: 842,527

[22] Filed: Mar. 21, 1986

[51] Int. Cl.$^4$ .............................................. H02K 41/00
[52] U.S. Cl. ........................................ 310/12; 310/14; 310/80; 310/216; 318/115; 318/135
[58] Field of Search ................... 310/80, 216–218, 310/83, 49, 12–14; 318/115, 135

[56] References Cited

U.S. PATENT DOCUMENTS

| | | | |
|---|---|---|---|
| 2,279,014 | 4/1942 | Sawyer | 310/217 X |
| 2,453,539 | 11/1948 | Reardon | 310/216 |
| 3,162,796 | 12/1964 | Schreiber et al. | 310/12 X |
| 3,185,909 | 5/1965 | Jahn | 310/12 X |
| 3,219,853 | 11/1965 | Schreiber | 310/14 |
| 3,441,819 | 4/1969 | Palmero | 318/115 |
| 3,829,746 | 8/1974 | Van | 310/12 X |
| 3,852,627 | 12/1974 | Davis | 310/216 X |
| 3,869,625 | 3/1975 | Sawyer | 310/12 |
| 3,889,165 | 6/1975 | Van | 318/115 |
| 3,898,487 | 8/1975 | Sobiepanek et al. | 310/80 |
| 4,090,097 | 5/1978 | Seilly | 310/27 |
| 4,105,904 | 8/1978 | Seilly | 310/27 |
| 4,123,691 | 10/1978 | Seilly | 318/119 |
| 4,145,625 | 3/1979 | Seilly | 310/80 |
| 4,197,488 | 4/1980 | Kant | 318/115 |
| 4,215,287 | 7/1980 | Otto | 310/216 |
| 4,286,180 | 8/1981 | Langley | 310/12 |

FOREIGN PATENT DOCUMENTS

| | | | |
|---|---|---|---|
| 55-97177A | 7/1980 | Japan. | |
| 945225 | 12/1963 | United Kingdom | 310/80 |
| 2088017 | 6/1982 | United Kingdom | 310/80 |

OTHER PUBLICATIONS

Gerraud et al., "Rectilinear Screw-Thread Reluctance Motor", 11/71, IEEE Proceedings, vol. 118, No. 11, pp. 1575–1584.
Pawlekto, J. P., and Chai, H. D., "Linear Step Motors," Proc. Second Annual Symp. on Incremental Motion Control Systems and Devices, Dept. of Elect. Eng., Univ. of Ill., Urbana, Apr. 1973.

(List continued on next page.)

Primary Examiner—Donovan F. Duggan
Attorney, Agent, or Firm—Carl C. Kling; Philip J. Feig

[57] ABSTRACT

Using a smooth laminated armature assembly, with a ferromagnetic double-helix stator shaft, provides an economical radial pole linear reluctance motor requiring no external armature bearings. The stator shaft has a double-helical screw tooth pattern cut into its surface. Spaces between screw threads are preferably filled with low permeability material. The armature assembly has radial pole laminar plates, separated by identically configured laminar spacers, separated by an insulating layer, which provides eddy current isolation, physical stability and original adjustment of laminations for overall accuracy to linear positioning, despite tolerances in the individual laminar plates. Each laminar plate has a number of inwardly projecting teeth centered about the internal channel. These internal teeth and the double helix screw teeth on the stator shaft provide flux paths through the stator. The armature assembly and the stator are complementary, and smoothed for sliding contact within the electromagnetically active envelope, without other bearings. Linear placement of radial pole laminar plates is achieved by dimensioning the radial pole laminar plates and/or the laminar spacers slightly less in thickness than nominal spacing requires, filling the space with epoxy, and pressing the end laminations together to nominal total length. Excess epoxy is squeezed out, leaving the laminations evenly spaced. Stator and armature may be assembled, or may be prepared with virtual teeth in homogeneous smooth surfaces. The virtual teeth are prepared by ferromagnetic modification of selected patterns through laser hardening or through chemical doping.

12 Claims, 11 Drawing Figures

OTHER PUBLICATIONS

Pawlekto, J. P., and Chai, H. D., "Linear Stepping Motor with Uncoupled Phases," *Proc. 13th Annual Symp. on Incremental Motion Control Systems and Devices*, Dept. of Elect. Eng., Univ. of Ill., Urbana, May 1984.

Hinds, W. E., and Nocito, B., "The Sawyer Linear Motor," *Proc. Second Annual Symp. on Incremental Motion Control Systems and Devices*, Dept. of Elect. Eng., Univ. of Ill., Urbana, Apr. 1973.

Dawkins, G. and Rhodes, D. J., "An Electromagnetic Rotary-to-Linear Coupler," *Proceedings of the Int. Conf. on Electrical Machines*, Brussels, Belgium, Sep. 11–13, 1978.

Chai, H. D., "Permeance Model and Reluctance Force Between Toothed Structures," *Proc. Second Annual Symp. on Incremental Motion Control Systems and Devices*, Dept. of Elect. Eng., Univ. of Ill., Urbana, Apr. 1973.

RADIAL POLE LINEAR RELUCTANCE MOTOR

BACKGROUND OF THE INVENTION

1. Field of the Invention

This invention relates to linear motors, and more particularly relates to a radial pole linear reluctance motor configuration having a smooth double-helix stator shaft and a smooth laminated armature made up as a stack of alternate radial pole laminations and spacer laminations separated by tolerance-compensating spacing cement layers, the resulting configuration allowing a balanced flux path across the stator shaft, and allowing smooth sliding contact of armature and stator shaft within the electromagnetically active envelope.

2. Related Prior Art

A large number of linear reluctance motors have been developed, including coupled-phase and uncoupled-phase variable reluctance designs as well as hybrid permanent-magnet designs. While these motors provide good performance, they have not achieved widespread commercial application. The relatively large cardinal step size of typical linear stepping motors, and the prohibitive cost of many closed-loop control schemes, have limited their use in high-resolution, highly-controllable actuator motion applications such as printers, plotters, robots, and disk drives.

Recently, however, the emergence of low-cost microcontrollers and the new generation of 'smart-power' devices has made feasible the use of sophisticated commutation and control schemes. These sophisticated control schemes eliminate many of the drawbacks of a conventional stepping motor. The stepper motor, for example, may be controlled as if it were a brushless DC servomotor.

Another reason for the limited use of linear variable-reluctance (VR) motors has been their high manufacturing costs relative to costs for rotary VR motors. The cost differential results from design details, such as shaft bearings requiring accurate alignment, and such as complex laminated armature/stator shafts, as well as higher production volumes of many rotary VR motors.

REFERENCES

Pawletko, J. P., and Chai, H. D., "Linear Step Motors," *Proc. Second Annual Symp. on Incremental Motion Control Systems and Devices,* Dept. of Elect. Eng., Univ. of Ill., Urbana, April 1973. Pawletko et al shows the theory and construction of a linearly laminated shaft linear motor.

Pawletko, J. P., and Chai, H. D., "Linear Stepping Motor with Uncoupled Phases," *Proc. Thirteenth Annual Symp. on Incremental Motion Control Systems and Devices,* Dept. of Elect. Eng., Univ. of Ill., Urbana, May 1984. Pawletko et al shows a linear pole variable reluctance stepping motor with uncoupled phases. This permits a confined flux loop through linearly adjacent teeth, with no cross coupling among phases.

Hinds, W. E., and Nocito, B., "The Sawyer Linear Motor," *Proc. Second Annual Symp. on Incremental Motion Control Systems and Devices,* Dept. of Elect. Eng., Univ. of Ill., Urbana, April 1973. Hinds et al shows the theory and construction of an X-Y positioner, including a toothed armature and stator separated by an air bearing.

Dawkins, G. and Rhodes, D. J., "An Electromagnetic Rotary-to-Linear Coupler," *Proceedings of the Int. Conf. on Electrical Machines,* Brussels, Belgium, Sept. 11-13, 1978, shows a helenoid coupler with a double-start helical thread, used to convert rotary motion to linear motion.

Chai, H. D., "Permeance Model and Reluctance Force Between Toothed Structures," *Proc. Second Annual Symp. on Incremental Motion Control Systems and Devices,* Dept. of Elect. Eng., Univ. of Ill., Urbana, April 1973. Chai provides a theoretical discussion of step motors, with formulas for permeance.

U.S. Pat. No. 3,441,819, Palmero, RECIPROCATING LINEAR MOTOR, Apr. 29, 1969, shows a linear motor in which flux flows axially from a helically toothed rotor to a toothed armature stack of alternate pairs of radial pole and spacer laminations, all of magnetic material. Palmero does not show any sliding rotor/stator contact, but rather shows "ball bushings" supporting the two ends of the shaft outside the electromagnetically active envelope.

U.S. Pat. No. 3,869,625, Sawyer, B. A., PLURAL AXIS LINEAR POSITION, Mar. 4, 1975, shows a helically threaded open toothed or filled toothed shaft platen coacting with a toothed channeled longitudinally moving head. The head is carried a fluid support bearing or on wheels which roll in channels along the length of the platen shaft. Sawyer uses spacers between electromagnetic coil subassemblies.

U.S. Pat. No. 4,090,097, Seilly, ELECTROMAGNETIC DEVICES, May 16, 1978, shows an actuator-stator relationship in which projections on one element fit into slots of the other.

U.S. Pat. No. 4,105,904, Seilly, ELECTROMAGNETIC ACTUATORS, Aug. 8, 1978, shows a double-start helix arrangement in which electromagnetic effects of currents through closely intertwined conductors interact directly, without any pole pieces.

U.S. Pat. No. 4,123,691, Seilly, ELECTROMAGNETIC DEVICES, Oct. 31 1978, shows an annular stator and movable armature, both with double-start helical grooves, and with the conductors positioned within the grooves of the stator.

U.S. Pat. No. 4,197,488, Kant, ELECTRICAL MACHINE, Apr. 8, 1980, shows a rotational-translational variable reluctance actuator having helical teeth in two mirror symmetrical half-planes.

U.S. Pat. No. 4,286,180, Langley, L. W., "Variable Reluctance Stepper Motor," Aug. 25, 1981, shows a variable reluctance stepper motor having matching helical threads on rotor and stator, and having spaces between threaded teeth filled with electrically conducting nonmagnetic solder, the resulting smooth stator rod ground, copper flashed and chromium plated, to form a hard stator surface of desired diameter for slider bearings at each end. Langley's slider bearings are outside the electromagnetically active area of the armature, but bear on smooth ferromagnetically active areas of the stator.

Koide, Japan Patent Application No. 55-97177A, LINEAR PULSE MOTOR, July 24, 1980, shows a specific formula of tooth pitch on the slider of a linear motor.

None of the prior art, either alone or in combination, shows the use of the actual stator and armature surfaces, within the electromagnetically active envelope, as a slider bearing. None of the prior art, either alone or in combination, shows the manufacturing technique for aligning pole laminations, nor the techniques of altering ferromagnetic properties of selected stator and armature surface patterns to form virtual teeth.

SUMMARY OF THE INVENTION

The object of the invention is to provide a low cost alternative to conventional lead-screw, belt-drive and cable-drive systems utilizing rotary motors.

A more specific object of this invention is to provide a compact, low-mass, low-cost linear motor suitable for use as the carriage drive mechanism in a wide range of serial printer applications.

Another object is to reduce manufacturing costs for a linear motor, by making the motor design sufficiently similar to existing rotary motor designs that much of the same production tooling can be used for the production of linear motors and rotary motors.

Another object is to provide a virtually self-contained carriage mechanism for serial printers and other peripheral devices.

A feature of the invention is a radial-pole armature stack design similar to stator designs of conventional rotary VR motors, to minimize production cost.

Another feature of the invention is a simple stator configuration, consisting primarily of a double-helical thread on a round shaft.

Another feature of the invention is a sliding contact, within the electromagnetically active envelope of the armature and the stator shaft, thus minimizing the need for stiffness of the stator shaft and minimizing the need for external bearings.

Another feature of the subject motor is the relative simplicity of the stator shaft, which is little more than a threaded shaft, which may be solid or may be a hollow tube, shaped by grinding to a precise dimension after the threads have been formed.

Another feature is the use of non-magnetic spacer laminations to provide smooth bearing surfaces on the armature poles, thus eliminating the need for external bearings common in previous designs.

The advantage of the invention is that it inexpensively provides high force output in a compact, low-mass package, and allows the motor force to be scaled easily by simply altering the count of radial pole/spacer lamination pairs (altering the length) of the stack.

Another feature of the invention is a simple method of fabricating the armature assembly to proper tooth intervals by squeezing excess spacing cement from the space between laminations.

Another feature of the invention is the provision of virtual teeth, that is, ferromagnetic variations in otherwise homogenous surfaces of stator and armature, prepared by selective case hardening or by masking and chemical doping.

Another advantage of the invention is that the simple stack, of radial pole laminations and spacer laminations bonded by tolerance-compensating spacing cement, provides good thermal characteristics and easy manufacturability at low cost.

The foregoing and other objects, features and advantages of the invention will be apparent from the following description of preferred embodiments, as illustrated in the accompanying drawings.

DESCRIPTION OF PREFERRED EMBODIMENTS

Figure 1:
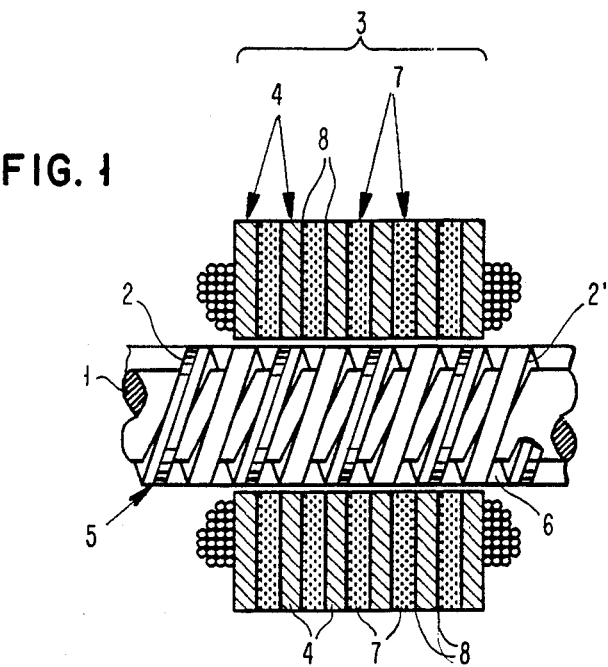
FIG. 1 is a cutaway elevation view of the linear motor, with coils partially removed, showing the double helix stator and the complementary laminar sets of radial pole lamination, filling cement, spacer lamination, and filling cement.

The linear motor comprises a round stator shaft 1, having a raised double-start helical thread tooth pattern 2—2' on it surface, and a round armature assembly 3, made up of a significant number of laminar plates 4, each having six internally-radiating poles designated P0-P5. The outside circumferential flat surface of stator teeth 2—2' is coated with a smooth wear layer 5, which may be a filler 6 for all the space between teeth, or may simply be a coating for the external surfaces of the helical thread teeth 2—2'. Wear layer 5 may be any of several available bonded fluoropolymers or other suitable material. Filler 6 may be any of several available nonferromagnetic fillers, such as bonded fluoropolymer, stainless steel wire, solder or the like. FIG. 1 shows helical tooth thread 2 shaded so as to differentiate it from its twin helical tooth thread 2', which is unshaded. The shading does not indicate any physical difference, but simply is a visual aid which helps to follow the respective helical tooth threads on the drawing. If desired, a hollow tubular stator shaft 1 may be used to provide lower overall mass or to provide greater stiffness-to-mass ratio than is available with a solid stator.

Figure 2:
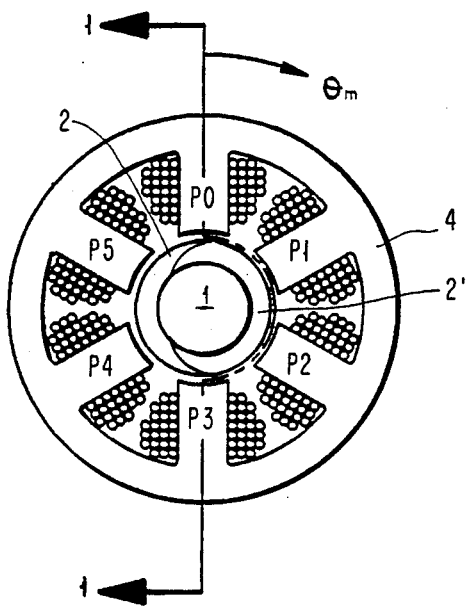
FIG. 2 is an end section view of the linear motor, showing a representative radial pole lamination of six poles with windings.

FIG. 2 shows the armature assembly 3, which comprises alternating laminar sets, each set comprising a ferromagnetic radial pole laminar plate 4 and a nonmagnetic spacer laminar plate 7, with epoxy spacing cement layers 8 between adjacent laminar plates. The pole lamination 4 and spacer 7 preferably have identical shapes and thicknesses for manufacturing convenience, but that is not necessary. The spacers may have reliefs to lessen overall mass, or for convenience. The pole laminations 4 are preferably ferromagnetic silicon iron; the spacers 7 are nonferromagnetic stainless steel. Stainless steel is normally considered paramagnetic (having a small but positive susceptability varying but little with magnetizing force) but for all practical purposes each spacer 7 in the armature may be considered a nonmagnetic air gap. Pole laminations 4 and spacers 7 have their adjacent surfaces insulated to minimize eddy currents, by insulation 8 which may be varnish or other convenient insulation, but preferably is epoxy. The laminated armature assembly 3 has armature poles which are physically smooth (after the bore of the armature has been ground) but which behave magnetically as if they contained infinitely deep teeth along the axis of the motor. The pitch of these teeth is equal to the combined thickness of one pole lamination 4 and one spacer 7, plus the thickness of two epoxy filling cement layers 8, used to bond the armature assembly together. The bonding layers 8 of epoxy cement, while not bulky, are slightly thicker than required for simple bonding. These relatively thick bonding layers between laminations are important. The bonding layers of filling cement 8 were easily altered in thickness, during manufacture, while the cement is still flowable, simply by squeezing out the excess. They thus provide the linear precision required for tooth spacing in the armature assembly 3, despite the additive effect of unbalanced within-tolerance variations in laminar plate thickness. That is, even if most laminations fell at the thin end of the tolerance range of thickness, the filler cement layers 8 filled the resulting space and kept the teeth properly spaced. Similarly, if most laminations fell at the thick end of the tolerance range of thickness, the filler cement layers 8 were squeezed out to provide the necessary space and keep the teeth properly spaced. Of course, if the laminations were balanced across the thin and thick ends of the tolerance range, individual teeth might be slightly off nominal placement, but there was no additive effect and no thickness tolerance accumulation in the stack. The very slight excess in total thickness of filler cement layers 8 thus provided for the expected worst case within-tolerance accumulation at the thick end of the range of tolerances. The preferred technique for assembling the stack, and squeezing the stack to achieve overall nominal pole placement linearly, will be discussed below, under the heading "MANUFACTURING COMSIDERATIONS."

From a magnetic point of view, the stator shaft is simply a round bar or tube of ferromagnetic material having a double thread formed in its surface. The pitch of each of the threads is twice the pitch of the armature teeth; therefore, the pitch of the double thread is equal to the tooth pitch on the armature. For bearing purposes, the surface of the stator shaft is coated with a durable, bonded-fluoropolymer layer, or other suitable material, to provide a low-friction bearing surface upon which the armature may slide and to provide an effective air gap between the armature poles and the stator. In a printer application, additional means not shown in FIG. 1 is required to prevent the armature assembly from rotating around the stator shaft during operation. One such means might be a wheeled outrigger, fixed to the armature, bearing onto a bar outside the travel envelope of the armature. Another such means might be one or more bearings or fingers, on the armature, which ride in axial grooves on the surface of the stator, preferably outside the electromagnetically active envelope.

Figure 3:
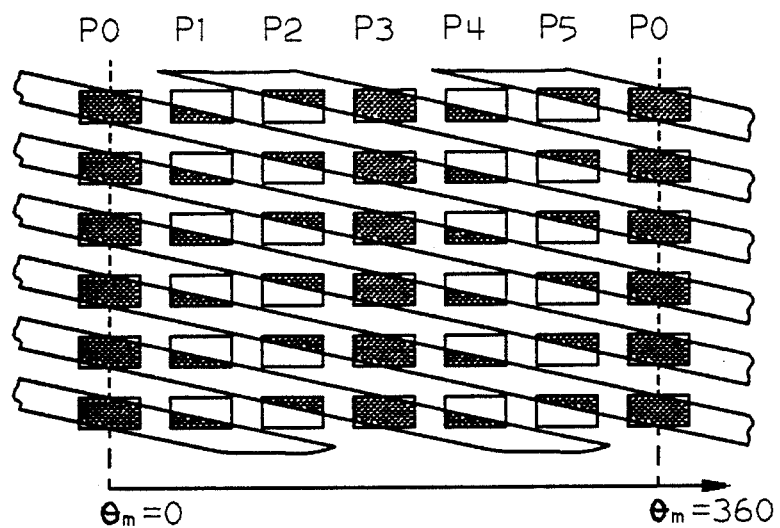
FIG. 3 is an unwrapped composite diagrammatic view of the linear motor armature poles and stator teeth.

The basic operation of the motor is shown in the 'unwrapped' motor view of FIG. 3. This depicts how the helical stator teeth overlap the magnetic teeth in the armature assembly. When the angled stator teeth are, on average, aligned with the magnetic laminations on pole number zero (P0), they are also aligned with the magnetic laminations on pole number three (P3) because of the double stator thread, as shown in FIG. 1 and FIG. 2. The effect of the slight angular misalignment of the armature teeth and the stator teeth will be considered below. Under these conditions the magnetic laminations on poles one and four are shifted axially one-third of the tooth pitch relative to the stator teeth while the magnetic laminations on poles two and five are shifted one-third of the pitch in the opposite direction, as shown in FIG. 3. Therefore, the armature can be moved relative to the stator in either direction by energizing the three phases (A, B, and C) formed by the diametrically opposed pole pairs (P0,P3; P1,P4; and P2,P5) in the appropriate sequence. Obviously, this operation is identical to the operation of a 3-phase rotary VR motor except for the orientation of the teeth on the armature and the stator. Therefore, all coil drive schemes typically used with rotary VR motors, including single-phase:

0,1,2,3,4,5 N—S— —S—N— —N—S and including double-phase, half-stepping, and microstepping, can be applied to the linear motor.

MANUFACTURING CONSIDERATIONS

The overall linear motor design is similar in some physical characteristics to prior art linear motors and linear-plus-rotary motors, which utilize single-helix or double-helix threads opposite one or more sets of coplanar teeth. The similarity of the armature assembly to the stator assembly of a rotary VR motor makes it possible to use known manufacturing tooling and techniques. In addition, it is possible to use identical geometry of radial pole laminations and spacer laminations, which allows both sets of laminations to be punched from the same die, at further decrease in overall manufacturing cost.

The linear motor according to this invention can partially overcome the advantages which hybrid motors generally have over variable-reluctance motors in terms of energy dissipation at a given output force, through greater simplicity and by the ease with which the motor force can be scaled by simply changing the count of radial poles (altering the length) of the lamination stack.

The armature of this linear motor is very similar to the stator of a rotary VR motor. There are, however, two significant differences in the manufacturing process which must be considered. Firstly, this linear motor requires alternating layers of ferromagnetic tooth laminations 4 and nonferromagnetic spacer laminations 7 in the armature stack 6. Secondly, this linear motor is somewhat sensitive to the axial positioning of the magnetic laminations. Therefore, it is very important that the laminations not be stacked in such a manner that slight errors in the lamination thicknesses would accumulate and result in an ever-increasing error in the axial position of the laminations as the stack length increases.

Figure 4:
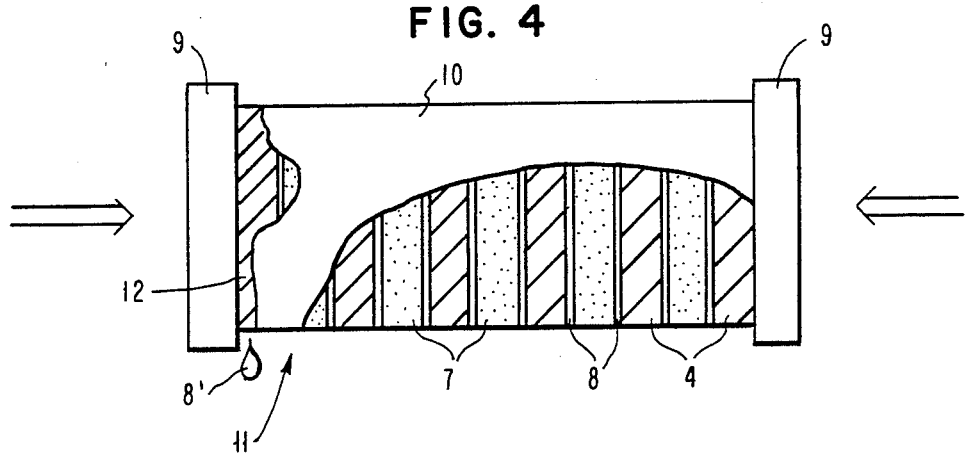
FIG. 4 is a diagrammatic showing of the method for bonding the stack of complementary laminar sets, each comprising radial pole lamination, filling cement, spacer lamination, and filling cement.

FIG. 4 shows how the error accumulation difficulty can be overcome to a large degree by dimensioning radial pole laminations 4 and spacer laminations 7 slightly thinner than desired, filling the space with a sufficiently thick layer of viscous epoxy, and then clamping between end caps 9 the laminated assembly, 3 in a form 10 which defines the correct overall stack length by closing gap 12. This squeezes out the excess epoxy 8', essentially in equal amounts in the space between each lamination, since the laminations are identically or at least regularly configured. When the epoxy sets, the correct spacing between the first and last laminations is guaranteed by the bonding fixture. The excess epoxy, shown schematically as drop 8', actually flows into voids or the stator channel and does not drip from the armature. The position of the interior laminations is determined by the squeezing out of excess epoxy between the joints. If the thickness of both the tooth and spacer laminations and the epoxy layer on each lamination are relatively consistent within one motor assembly (a reasonable assumption in a mass-production environment, since dimension drift within tolerances tends to occur more between batches than between identical units in the same batch, and temperature humidity differences are minimized) then the clamping pressure exerted on the end laminations will squeeze out the excess epoxy uniformly from between all lamination joints. As a result, the interior laminations distribute themselves approximately evenly between the first and the last laminations, which is their desired position.

It is not necessary to maintain perfect lamination spacing, but only to limit maximum absolute position errors to a reasonable fraction of the tooth pitch over the length of the motor. For example, if the lamination position errors are assumed to be distributed uniformly between plus and minus one-eighth of the tooth pitch, the peak motor force is decreased by 2%–10%, given a typical force-versus-displacement curve for a single lamination.

If very precise spacing of the magnetic laminations should be required, external tabs on the magnetic laminations and/or indentations on the periphery of the spacer laminations can be used to allow alignment of the magnetic laminations with a comb-like fixture during assembly.

In certain applications it is sufficient to coat the threaded shaft directly with a suitable bearing layer and to have the ground surfaces of the armature poles riding directly on the coated shaft. In other applications, requiring longer life or smoother operation, the grooves in the shaft are filled with a non-magnetic material, e.g. stainless steel wire or a filled epoxy, prior to final stator grinding and coating. If desired, a bearing coating 5 may also be placed on the surfaces of the armature poles.

In the production of the linear motor, there are only three critical dimensions, as follows:
1. the diameter of the stator shaft,
2. the diameter of the armature bore, and
3. the thickness of the bearing coating.

Figure 5:
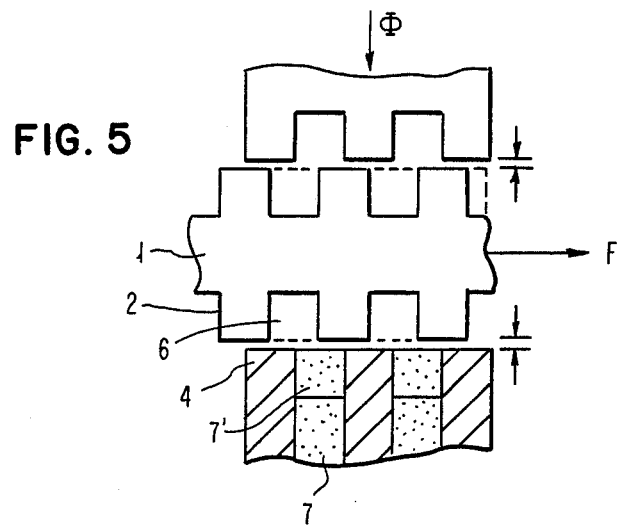
FIG. 5 is a diagram showing flux direction and force vectors for a representative tooth opposition in armature and stator.

These three dimensions determine the air gap between the armature and the stator, the bearing clearance of the armature on the coated stator, and the maximum possible eccentricity of the stator within the armature bore. The air gap determines the output of the motor as a function of coil current flux as shown in FIG. 5 and axial position, the bearing clearance determines the amount of lateral motion, vibration, and noise produced by the motor; and the eccentricity determines the net side force (and therefore the friction) acting on the motor, as will be described below. Fortunately, all three of these critical tolerances occur on internal or external diameters which can be accurately controlled in a mass-production environment.

The smooth double-start helical thread toothed stator shaft 1 is preferably cut from a steel shaft by normal machining techniques, filled as desired, and sprayed with wear coating 5.

Figure 6:
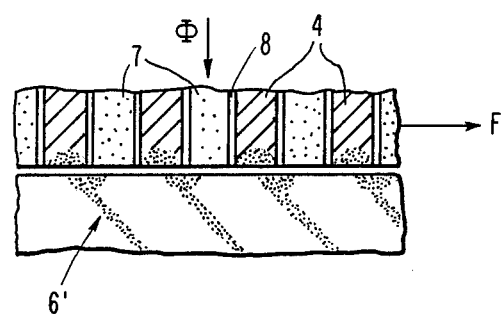
FIG. 6 is a diagram showing a bonded complementary laminar set stack armature with bonded teeth in opposition to virtual teeth, in the stator, formed by selective hardening of a double helix thread on the stator shaft.
Figure 7:
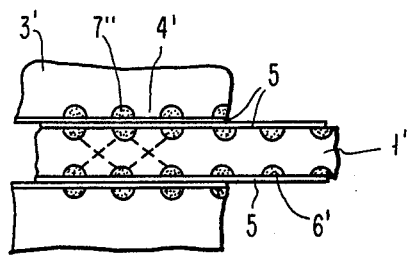
FIG. 7 is a diagram showing virtual teeth on both armature and stator, with protective film for lubrication.
Figure 8:
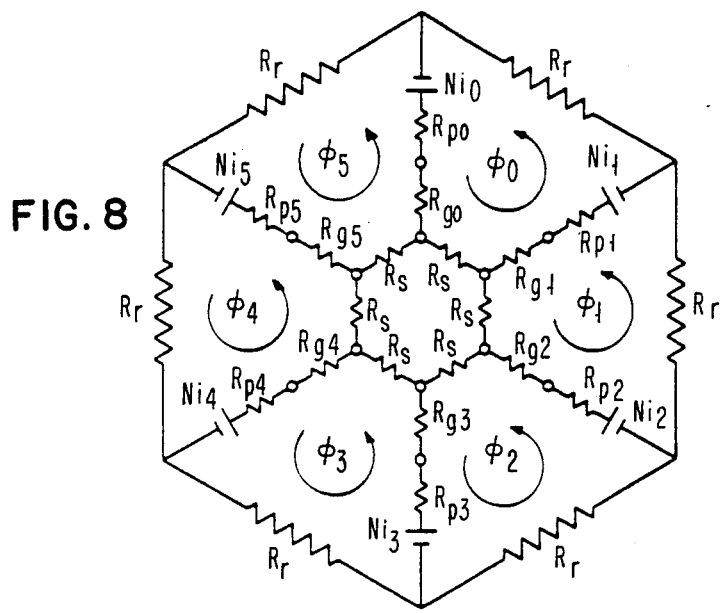
FIG. 8 is a lumped-parameter magnetic circuit model of the linear motor.

The smooth double-helix stator may also be manufactured with 'virtual' teeth formed by selectively altering the magnetic properties of a ferromagnetic material. Such a stator is shown in FIGS. 6 and 7. This reduces the overall complexity of the electromagnetic actuator and also simplifies the manufacture. Stepping motors and other actuators make use of the magnetic force which acts to align opposing sets of ferromagnetic teeth, which are separated by a small air gap. Magnetic flux crosses the air gap (see FIG. 1). This aligning force can be expressed as:

$$F_{align} = -\frac{1}{2} \phi^2 \frac{\partial R}{\partial x}$$

where $\Phi$ is the total flux flowing across the air gap, R is the total reluctance of the air gap, and x is the relative horizontal displacement of the two sets of teeth. There is also a strong force acting to attract these two sets of teeth which is given by:

$$F_{attract} = -\frac{1}{2} \phi^2 \frac{\partial R}{\partial y}$$

where y is the relative vertical displacement of the teeth. The variation in reluctance as a function of horizontal displacement is caused by the difference between the magnetic permeability of the teeth and the magnetic permeability of the air space between the teeth. (Note that the term 'air space' refers here to the space between adjacent teeth on the same structure, not to the small space separating the two sets of teeth, one set on the armature and one set on the stator, which will be called the 'gap'). It is very important to note that the attractive force between two sets of teeth (across the gap, drawing armature and stator together) is generally several times greater than the aligning force. Therefore, in order to utilize the aligning force in an actuator, the attractive force must be balanced or supported in some manner. Often, a nominally-balanced system is achieved by using transverse flux energization as shown in FIG. 5. If the armature in this case is perfectly centered, then the net attractive force acting on the armature is zero, at least theoretically. In practice, however, it is essential that some sort of bearing assembly be used to support the inevitable unbalanced attractive forces which result from small, unavoidable differences in the two air gaps. This need for bearings substantially increases the cost and complexity of many actuators, particularly because it is not generally feasible to use the toothed surface as any portion of the bearing system. In other words, the need for bearing surfaces generally requires the addition of smooth surfaces to the stator and/or the armature and the precise adjustment of several ball-bearings. The primary advantage of the use of virtual teeth, which will be described below, is to simplify the bearing assembly and thus reduce the manufacturing and assembly cost for a wide variety of actuators.

VIRTUAL TEETH

The only requirement for generating an aligning force between two sets of teeth is the the "tooth" portion have magnetic properties differing from the "space" portion. Generally, the magnetic permeability of the tooth is much higher than the permeability of the space; however, it is also possible to use a difference in saturation flux density between the tooth and the space. In the case of different saturation flux densities, the actuator provides an aligning force only when the flux density is sufficient to saturate the spaces, causing the spaces to exhibit incremental permeabilities lower than the permeabilities of the teeth. In summary, then, it is not necessary to remove material physically to form spaces 7' between megnetic teeth 4'; it is sufficient to create alternating regions of material with good and bad magnetic properties. In other words, the physical teeth in the actuator can be smooth "virtual" teeth having varying magnetic properties (permeability and/or saturation flux density). There is no dimensional physical distinction between the "tooth" portions 4' and the "space" portions 7' (see FIG. 6). These virtual teeth are electromagnetically valid, but present a continuous, physically smooth, shaft surface.

There are two preferred techniques to alter locally the magnetic properties of ferromagnetic materials, as follows:

1. Thermal Technique, Selective Quench Hardening

Virtual teeth can be formed by localized quench hardening of metals which exhibit differing ferromagnetic qualities when hardened than when annealed. An example of a thermal technique is laser hardening. Laser hardening, in selected positions, is a known process for making bearings, but has heretofore not been used to make virtual teeth. In this procedure, a laser beam is used to heat locally a very small area of the surface of a material for a short period of time. When the laser is either turned off or is moved to another region on the surface, the original heated region is rapidly quenched by the relatively large mass of surrounding cooler material. This self-quenching is sufficiently fast to case harden a wide variety of steels in whatever pattern is traced by the laser (assuming that sufficient peak temperatures are obtained). Many steels have quite good magnetic properties in their annealed state but greatly reduced permeability and saturation flux density in their hardened state. They are subject to selective hardening (in the "space" regions) to form virtual teeth.

2. Chemical Technique, Using Selective Diffusion

An example of a chemical method for locally changing magnetic properties is the carbon-nitriding of a low-carbon steel with a copper mask on the surface. The copper mask can easily be produced using conventional photo-lithography procedures. In the hardening process, the carbon and nitrogen diffuse into the surface only at the unmasked areas. The diffusion proceeds isotropically into the material, undercutting the mask as the diffusion proceeds. If necessary, this undercutting can be largely compensated for during the mask generation.

There are a number of other possible techniques for locally modifying magnetic properties to produce virtual teeth. Laser activated diffusion, selective diffusion through permeable/nonpermeable plating, and various additive processes can result in dimensionally homogeneous, ferromagnetically differing shafts, that is, can result in shafts with virtual teeth.

In general, all of the techniques for changing magnetic properties will have inherent limitations on the obtainable aspect ratio (the ratio of depth to width) of the affected region. Also, the boundary between the affected and unaffected regions will not be a sharp boundary with infinitesimal transitional areas. In fact, in most cases it may not be feasible to have as aspect ratio much greater than one-half, or a boundary region much thinner that a few dozen microns. Clearly, then, it is not likely that virtual teeth will provide as large or as sharp a variation in magnetic properties as physical teeth can provide. Therefore, the aligning force provided by the virtual teeth will likely be significantly smaller than the force produced with physical teeth.

The principle advantage of the virtual teeth is that they replace a physically stepped surface, which is very difficult to use for bearing purposes, with a smooth surface which is quite suitable for bearing purposes in some applications. When cost is of primary concern, and the performance requirements for the actuator are not severe, the reduction in aligning force resulting from the use of virtual teeth will more than be compensated for by the simplified bearing configurations made possible with the smooth surface. The best teeth make bad bearings; virtual teeth are not great teeth but make good bearings.

One possible bearing configuration is shown in FIG. 7, which shows virtual teeth on both stator 1' and armature 3'. In this example, the smooth surfaces of the mating sets of respective virtual teeth 4' and 4" are treated with a bonded fluoropolymer coating 5. Such coatings have recently been developed to provide excellent wear and lubrication properties, e.g. coefficients of friction as 0.02 and wear coefficients as low as $6 \times 10^{-10}$ in$^3$ $\times$min/(lb$\times$ft$\times$hr) The wear coating shown would probably be between 0.7 and 2 mils thick (the optimum thickness according to the manufacturer's literature) and would serve as the air space as well as the bearing surface. If a larger air space were desired (to reduce unbalanced attractive forces when the fluoropolymer coating wears), an additional nonmagnetic, nonconductive layer could be bonded to the surface of the virtual teeth before the wearing coating is applied.

The surfaces of the virtual teeth, when properly coated, serve directly as bearing surfaces, substantially reducing the cost and complexity of the actuator design.

MAGNETIC MODEL

A magnetic circuit model of the motor is used to explore the effects of armature/stator concentricity, phase current, and axial alignment on motor performance. Predicted static motor performance agrees well with experimental data for a typical motor, showing axial forces of 10-20 Newtons with a 138 gram armature. In addition, the motor performs well under open-loop control at a velocity of 0.45 m/sec.

The motor shown in FIG. 1 is modeled using the lumped-parameter magnetic circuit shown in FIG. 4. The model consists of six magnetomotive sources, $Ni_0$--$Ni_5$, which represent the coils on each of the armature poles; six reluctances $R_{g0}$-$R_{g5}$, representing the air gap reluctance at each pole as a function of radial gap and axial position; and six linear reluctances each to represent the armature poles, $R_p$, segments of the outer ring of the armature, $R_r$, and portions of the stator shaft $R_s$. Given the above model, the six loop fluxes shown in FIG. 4 are given by:

$$Ni_k - Ni_{k+} = -[R_p + R_{gk}]\phi_{k-} + [R_{gk} + R_{gk+} + 2(-R_p + R_s + R_r)]\phi_k - [R_p + R_{gk+}]\phi_{k+} \quad (1)$$

for k=0, ..., 5 and k+ ≡(k+1) modulo 6 k− ≡(k−1) modulo 6.

The average axial displacement of the teeth on each of the poles relative to the helical teeth on the stator shaft is:

$$x_k = x_0 + \frac{k}{3} P \quad (2)$$

where P is the pitch of the teeth. The average air gap length between the stator shaft and each of the pole faces is given as:

$$g_k = G_{ave}\left[1 - E\cos\left(2\pi \frac{k}{5}\right)\right] \quad (3)$$

where $G_{ave}$ is the average gap length of all six poles and E is the eccentricity ratio, defined as $\delta_0/G_{ave}$, where $\delta_0$ is the displacement of the shaft center from the center of the armature bore towards pole number zero. Given the air gap, $g_k$, and the tooth misalignment, $x_k$, for each pole, the air gap reluctances, $R_k$, were approximated using a permeance model. The effects of the skew angle between the armature teeth and the stator teeth have been ignored in the permeance model but will be accounted for below in the presentation of the results. The iron reluctances are calculated as a function of the iron permeability and the length and cross-section of the appropriate flux paths, assuming no saturation of the iron.

The six simultaneous, linear algebraic equations defined in (1) can readily be solved for the six loop fluxes as a function of axial shaft position, shaft eccentricity, and coil current in each of the six coils. The total flux flowing in each pole, which determines the axial and radial force contribution of the pole, is defined as:

$$\Phi_k = \phi_k - \phi_{k-} \quad (4)$$

The axial force contribution of each pole can be defined as:

$$f_{ak} = -\frac{1}{2} \phi_k^2 \frac{\partial R_k}{\partial x_0} \quad (5)$$

while the radial force contribution of each pole can be defined as:

$$f_{rk} = -\frac{1}{2} \phi_k^2 \frac{\partial R_k}{\partial g_k} \quad (6)$$

The partial derivative of the gap reluctance with respect to axial displacement was obtained directly from the permeance model, while the partial derivative with respect to the gap length was obtained by finite differences.

Figure 9:
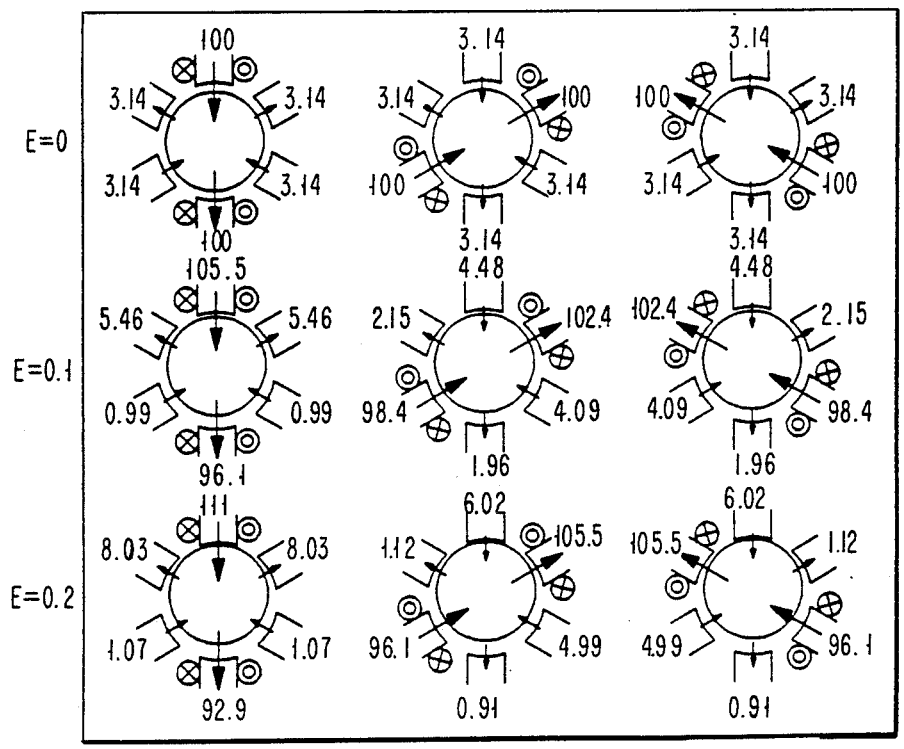
FIG. 9 is a composite diagram showing flux distribution at detent positions for each of three phases under conditions of zero, ten percent, and twenty percent eccentricity of the stator towards pole zero. (Flux units are arbitrary).

FIG. 9 shows the predicted flux distribution in a typical linear motor under various eccentricity and phase-energization conditions. The top row of the figure shows the flux distribution for each phase when the stator shaft is perfectly centered within the armature bore, i.e. E=0. As expected, the predicted flux distributions for the three phases are identical (except for the expected rotation), with the majority of the flux flowing directly from pole zero, across the stator shaft, and into pole three. The minor flux paths through the non-energized poles are a consequence of the finite iron permeability. Also as expected, the magnetic flux flowing in any given pole is equal to the flux flowing in the diametrically-opposed pole; thus canceling all radial force contributions of the poles. The first column of FIG. 9 shows how the flux distribution changes if the stator shaft is shifted towards pole zero by ten and by twenty percent of the radial gap. Clearly, the eccentricity results in an increase in the flux flowing in poles P0, P1, and P5 and a decrease in the flux flowing in poles P2, P3, and P4. This lack of symmetry between opposing poles produces an undesirable net radial force between the armature and the stator, as well as affecting the axial force contributions of each of the poles. The second and third columns of the figure show the flux distribution in the motor as a function of stator eccentricity towards pole zero under Phase B and Phase C energization, respectively.

Figure 10:
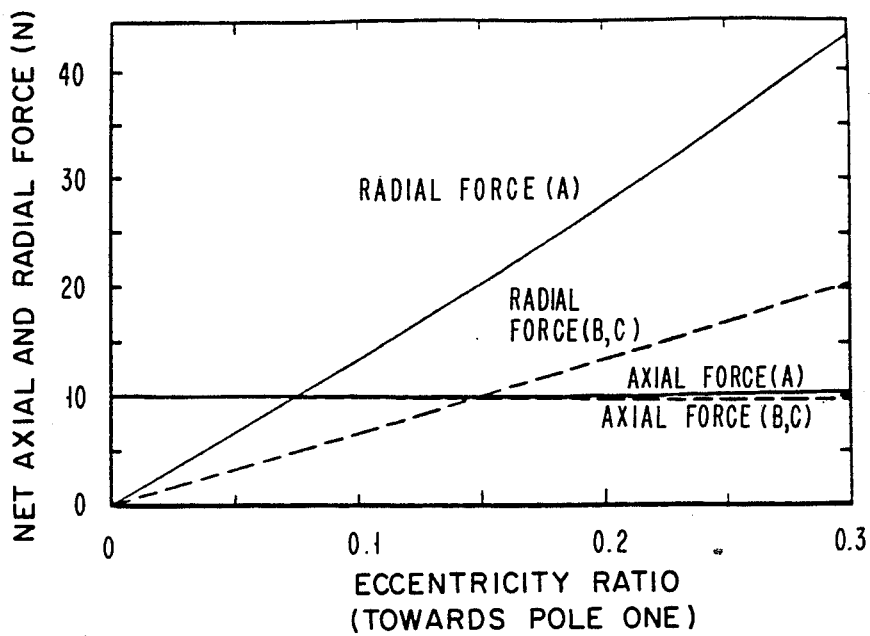
FIG. 10 is a force v. eccentricity diagram showing predicted axial and radial force produced by a typical linear motor as a function of stator eccentricity with single-phase excitation.

Net radial forces in the motor produced by flux asymmetry have two undesirable consequences: increased frictional drag on the armature, and the creation of noise and vibration by collisions of the armature with the stator. The net force produced by a typical motor in both the radial and the axial direction is shown in FIG. 10 as a function of stator eccentricity and phase energization. The curves represent the peak forces produced with energization of the phase shown in parenthesis. It is important to note that the peak radial and the peak axial forces shown do not occur simultaneously; the peak radial force occurs at the detent condition when the armature and the stator teeth for the energized phase are aligned and the axial force is zero, while the peak axial force occurs when the two sets of teeth are displaced by roughly 20-30 percent of the tooth pitch. As shown, the axial force produced by the motor is quite insensitive to the eccentricity ratio while the radial force is a strong function of the eccentricity. The net radial force increases approximately linearly with increasing eccentricity, equaling the peak axial force under Phase A energization at an eccentricity ratio of around seven percent. Given that typical bearing coatings exhibit a coefficient of friction less than 0.1, the data in FIG. 10 points out the necessity of keeping eccentricity ratios below roughly 0.2 for the frictional loads to remain an acceptably small fraction of the motor's axial force.

Figure 11:
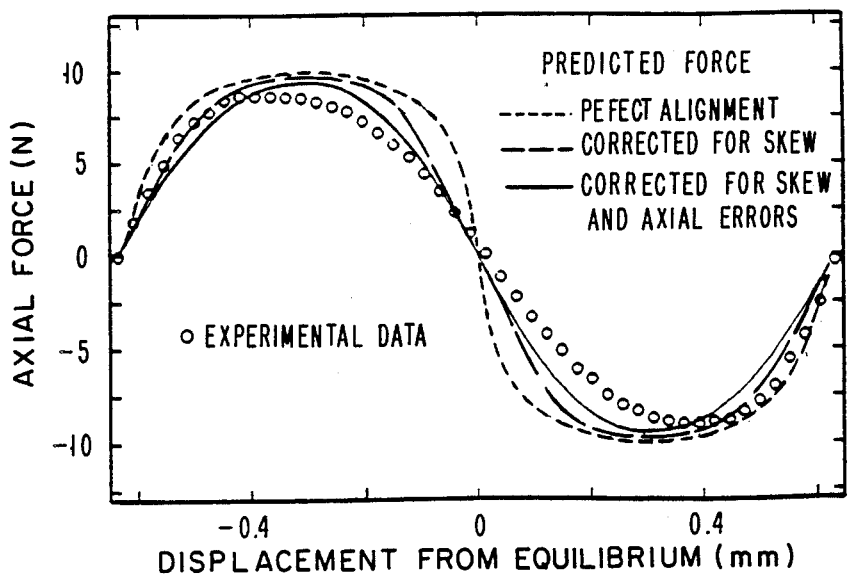
FIG. 11 is a diagram showing typical experimental and theoretical results for axial motor force as a function of displacement from equilibrium under single-phase excitation.

FIG. 11 shows the predicted and the measured axial force produced by a typical motor as a function of displacement from equilibrium. The predicted force is shown for three conditions: perfect tooth alignment; corrected for skew; and corrected for both skew and axial position errors. The perfect alignment case neglects the errors introduced by the lead angle of the helical teeth and the position errors of the magnetic laminations. These errors have also been neglected in the results presented above. If the helical lead angle is small, then each of the armature teeth can be considered as a large number of partial teeth, each of which is perfectly aligned angularly with the stator tooth but which is misaligned axially by varying amounts. Then, each of the partial teeth can be modeled using conventional permeance equations and the total tooth response can be considered as the sum of the responses of the angularly aligned partial teeth. In other words, the force produced by a single angularly misaligned tooth at an average axial misalignment of x is approximately equal to the average of the force produced by a large number of teeth having axial misalignments evenly distributed between (x−δ) and (x+δ) where δ is the axial misalignment of the edge of an angularly misaligned tooth when the center of that tooth is aligned with the opposing tooth. In the case of a typical motor, δ might be equal to 0.14 mm and the average force resulting from the tooth skew would be as shown in FIG. 6. If the force-versus-displacement profile for a single aligned tooth is assumed to be sinusoidal, then the average process to correct for tooth skew can be performed analytically, resulting in a sinusoidal force profile having an amplitude of $$\frac{\sin(2\pi\delta/P)}{2\pi\delta/P}$$

times the uncorrected force amplitude. For δ equaling 0.14 mm, this simplified analysis predicts a decrease of 8 percent for the motor shown. However, this is a pessimistic error estimate because the ideal force profile is not sinusoidal but is rather flat on top, which results in the smaller force decrease shown in the figure.

The effect of axial tolerances in the armature lamination position can be approximated by averaging the skew-corrected force profile described above over the range of lamination alignment error. The resulting force profile is also shown in FIG. 7, assuming uniformly distributed lamination position errors between plus and minus 0.125 mm in a typical motor. Note that while the corrections for tooth skew and axial lamination position do not substantially reduce the peak force produced by the motor, the corrections do significantly change the overall shape of the profile, reducing the somewhat square shape of the ideal profile to a more sinusoidal profile which more closely resembles the experimental data.

A widely used measure of performance for linear motors is the ratio of the motor force to the armature mass. Under unsaturated conditions, one typical linear motor produced a peak force-to-mass ratio of 71 m/sec$^2$ (7.25 G's). With three Amps, the force-to-mass ratio of the motor is 149 m/sec$^2$ (15.2 G's). While these theoretical accelerations are quite good compared to existing motors, it is quite possible that significant improvements to the force-to-mass ratio can be obtained by utilizing lower mass non-magnetic laminations, and a slightly larger average air gap, and perhaps aluminum coil wire.

The invention has been shown and described as a linear motor with a smooth double-helix stator shaft and smooth laminated armature allowing smooth sliding contact within the electromagnetically active envelope. The method of making a laminated armature, as well as the method of making a stator or armature having virtual teeth, have been shown.

Thus, while the invention has been described with reference to preferred embodiments, it will be understood by those skilled in the art that the foregoing and other changes in form and details may be made without departing from the scope of the invention.

What is claimed is:

1. A linear variable reluctance motor having relatively movable aramture and stator members, and electromagnetic windings on at least one of said members forming an electromagnetically active envelope of said first and second members, characterized in that:
   a first one of said members comprises a stack of laminar pairs of alternate radial pole ferromagnetic laminar plates and nonferromagnetic laminar spacers, with a smooth internal channel having an inside diameter complementary to the outside diameter of said first member to allow a sliding relationship within the electromagnetically active envelope of said first and second members, each laminar pair of laminar pole plate and laminar spacer together with related cement being dimensioned in total thickness substantially equal to one tooth interval, said laminar pole plate and laminar spacer being separated by at least one insulating layer to minimize eddy currents, the total aggregate thickness of said laminar pairs and spacing cement being equal to nominal stack length,
   whereby the teeth are positioned with their average linear tooth interval equal to the nominal tooth spacng.

2. A linear variable reluctance motor according to claim 1, wherein said laminar pairs of radial pole ferromagnetic laminar plates and of nonferromagnetic laminar spacers are configured identically.

3. A linear variable reluctance motor according to claim 1, wherein said laminar pairs of radial pole ferromagnetic laminar plates and of nonferromagnetic laminar spaces are configured similarly; so as to provide a generally continuous inside diameter channel, but said spacers are relieved for reduction in mass.

4. A linear variable reluctance motor according to claim 1, wherein said first member is a hollow shaft of ferromagnetic material.

5. A linear variable reluctance motor according to claim 1 wherein said first member is a shaft having its outside diameter of treated substantially homogeneous material having virtual teeth separated by virtual spaces, said virtual teeth and said virtual spaces being of substantially identical dimensions but of differing ferromagnetic properties as a function of treatment.

6. A linear variable reluctance motor according to claim 1, wherein said second member is an armature having a channel with its inside diameter of treated substantially homogeneous material having virtual teeth separated by virtual spaces, said virtual teeth and said virtual spaces being of substantially identical dimensions but of differing ferromagnetic properties as a function of treatment.

7. A linear variable reluctance motor according to claim 1, wherein said first member is a shaft having its outside diameter of treated substantially homogeneous material having virtual teeth separated by virtual spaces, said virtual teeth and said virtual spaces being of substantially identical dimensions but of differing ferromagnetic properties, and wherein said second member is an armature having a channel with its inside diameter of treated substantially homogeneous material having virtual teeth separated by virtual spaces, said virtual teeth and said virtual spaces being of substantially identical dimensions but of differing ferromagnetic properties as a function of treatment.

8. A linear variable reluctance motor according to claim 1, wherein said insulating layer comprises a layer of spacing cement which both bonds the assembly together and provides, on average, nominal spacing for said laminar pole plates.

9. A linear variable reluctance motor according to claim 1, wherein at least one of said armature and stator members comprises virtual teeth of treated substantially homogeneous magnetoactive material exhibiting substantially differing ferromagnetism in annealed form as contrasted to case hardened form, selectively treated for case hardening, thus forming the virtual tooth pattern.

10. A linear variable reluctance motor according to claim 1, wherein at least one member said armature and stator members comprises virtual teeth of treated substantially homogeneous magnetoactive material exhibiting substantially differing ferromagnetism when treated with a dopant chemical as contrasted to undoped form, selectively doped, thus forming the virtual tooth pattern.

11. A linear variable reluctance motor having relatively movable armature and stator members, and electromagnetically windings on at least one of said members forming an electromagnetically active envelope of said first and second members, characterized by in that:
    a first member comprising a ferromagnetic shaft having double helix tooth pattern with outside diameter forming a smooth even cylinder; and
    a second member comprising a stack of laminar pairs of alternate radial pole ferromagnetic laminar plates and nonferromagnetic laminar spacers, with an internal channel having an inside diameter complementary to the outside diameter of said first member to allow a sliding relationship within the electromagnetically active envelope of said first and second members, each laminar pair of laminar pole plate and laminar spacer together being dimensioned in total thickness slightly less than one tooth space, said stack being bonded by spacing cement layers interspersed between said laminar pole plate and said laminar spacer, and of total thickness greater than necessary for bonding, the sum of said spacing cement layers complementing the total thickness of said laminar pairs to achieve nominal stack length,
    whereby the teeth are positioned with their average linear tooth interval equal to the nominal tooth spacing average.

12. A linear variable reluctance motor having electromagnetic windings, and having relatively movable armature and stator members operating under electromagnetic control within an electromagnetically active envelope characterized by
    a first member comprising a ferromagnetic shaft having a raised double helix thread tooth pattern, filled between teeth with nonferromagnetic material and with the filled pattern coated with a smoothing layer with outside diameter forming a smooth even cylinder; and
    a second member comprising a stack of laminar pairs of alternate radial pole ferromagnetic laminar plates and nonferromagnetic laminar spacers, with an internal channel having an inside diameter complementary to the outside diameter of said first member to allow a sliding relationship within the electromagnetically active envelope, each laminar pair of laminar plate and laminar spacer together being dimensioned in total thickness slightly less than one tooth space, and stack being bonded by epoxy spacing cement layers interspersed between said laminar pole plates and said laminar spacers, the total thickness of spacing cement being slightly greater than necessary for bonding, the sum of said spacing cement layers complementing the total thickness of said laminar pairs to achieve nominal stack length,
    whereby the teeth are positioned with their average linear tooth interval equal to the nominal tooth spacing,
    and said first member and said second member are in sliding contact relationship within the electromagnetically active envelope.

* * * * *